United States Patent [19]
Tobin

[11] Patent Number: 5,507,336
[45] Date of Patent: Apr. 16, 1996

[54] METHOD OF CONSTRUCTING FULLY DENSE METAL MOLDS AND PARTS

[75] Inventor: James R. Tobin, Cincinnati, Ohio

[73] Assignee: The Procter & Gamble Company, Cincinnati, Ohio

[21] Appl. No.: 373,137

[22] Filed: Jan. 17, 1995

[51] Int. Cl.$^6$ .............................. B22C 9/04; B22D 19/14
[52] U.S. Cl. ................... 164/34; 164/97; 164/529
[58] Field of Search ............................... 164/529, 34, 27, 164/28, 29, 97, 98

[56] References Cited

U.S. PATENT DOCUMENTS

| | | | |
|---|---|---|---|
| 918,069 | 4/1909 | Marius | 164/97 |
| 3,751,271 | 8/1973 | Kimura et al. | 106/40 R |
| 3,823,002 | 7/1974 | Kirby, Jr. et al. | 29/182.1 |
| 3,829,295 | 8/1974 | Farmer et al. | 29/182.1 |
| 3,894,575 | 7/1975 | Baum | 164/97 |
| 3,915,699 | 10/1975 | Umehara et al. | 75/208 R |
| 3,929,476 | 12/1975 | Kirby, Jr. et al. | 75/214 |
| 4,048,709 | 9/1977 | Deem | 164/28 |
| 4,327,156 | 4/1982 | Dillon et al. | 428/568 |
| 5,249,620 | 10/1993 | Guerriero et al. | 164/97 |

FOREIGN PATENT DOCUMENTS 2303672  12/1990  Japan.

OTHER PUBLICATIONS

"Recommended Foundry Procedure for Shell Investment Casting Using Quickcast Stereolithography Patterns"—Quickcast Foundry Reports—pp.4–7—Dr. P. F. Jacobs—Apr., 1993.
"Metal Parts From Selective Laser Sintering of Metal–Polymer Powders"—Solid Freeform Fabrication Symposium Proceedings—pp. 141–146 Badrinarayan & Barlow—1992.
"Rapid Manufacture of Prototype Injection Molds Using the Selective Laser Sintering Process"—Masters Thesis for University of Texas at Austin—J. R. Tobin—May, 1994.
"Precision Casting of Plastic Tooling by the Unicast Process"—SME Paper #CM70–118 R. J. Fitzgerald—No Date.
"Metal Parts Generation by Three Dimensional Printing"—Michaels, Sachs, Cima—Conference Proceedings, Fourth International Conference on Rapid Prototyping—1993.
"Keltool: Fast Tooling from Rapid Prototype Patterns"—Rapid Prototyping Report, vol. #1—Jun., 1991.
Tool and Manufacturing Engineers Handbook, vol. #2—Chapter 16, pp. 52–66—Society of Manufacturing Engineers—1984.

*Primary Examiner*—Richard K. Seidel
*Assistant Examiner*—Randolph S. Herrick
*Attorney, Agent, or Firm*—Ronald W. Kock

[57] ABSTRACT

A method of constructing a fully dense metal part or a metal mold half for mating with another mold half to form a mold for casting multiple parts. Steps include placing a pattern in a tubular mold base, casting a ceramic member onto critical surfaces of the pattern, removing the pattern from the mold base, covering the critical surfaces transferred to the ceramic member with a powdered metal having a melting temperature greater than that of an infiltration metal, placing a quantity of an infiltration metal over the powdered metal, placing the tubular mold base in a furnace at a temperature sufficient to melt the infiltration metal without melting the powdered metal, and removing the ceramic member from the first open end of the tubular mold base to expose the critical surfaces. The quantity of the infiltration metal is sufficient to fill voids between the particles of the powdered metal when the infiltration metal is melted, thereby generating a fully dense metal part. The metal part has the critical surfaces transferred from the ceramic member when the infiltration metal solidifies. The metal powder also acts as a filter to filter out any contamination or oxidized metal within the infiltration metal so that such contamination does not blemish the finished surface of the fully dense metal part.

11 Claims, 3 Drawing Sheets

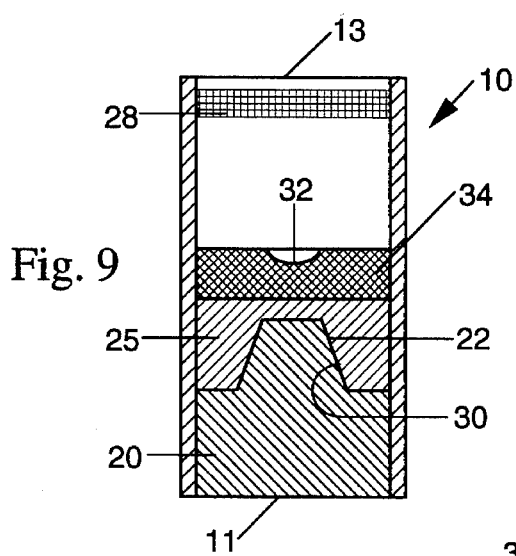
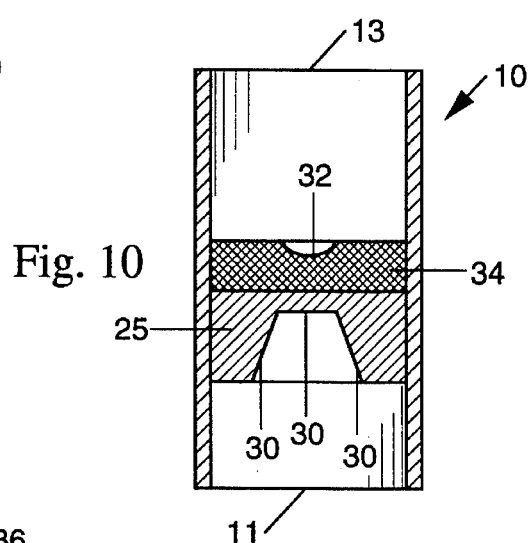
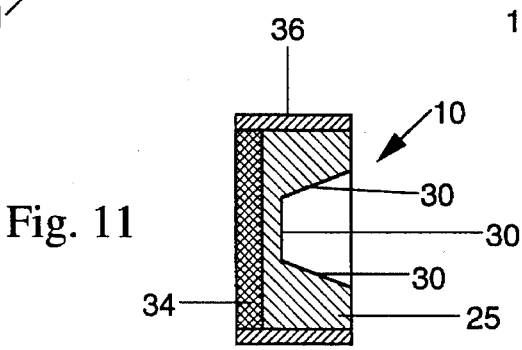
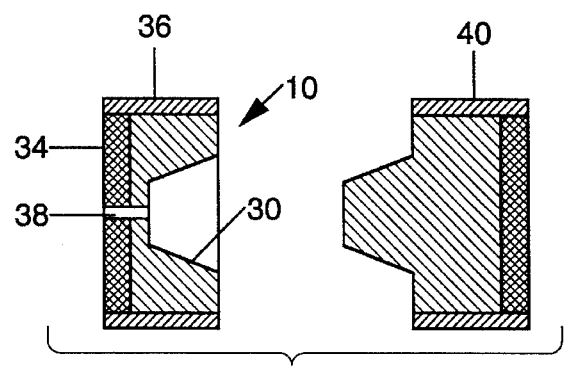
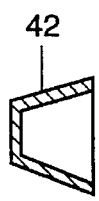

METHOD OF CONSTRUCTING FULLY DENSE METAL MOLDS AND PARTS

FIELD OF THE INVENTION

The present invention relates to methods for rapid prototyping, and more particularly to methods for constructing accurate metal parts and metal molds from which multiple prototype parts may be molded.

BACKGROUND OF THE INVENTION

Getting new products to the market faster than one's competition is recognized as a key to gaining a large market share. Thus, there is an incentive to speed up every step of new product development. One area of product development having a significant impact on overall market timing is the making of product and package prototypes for market testing. Such testing usually requires multiple look-like, feel-like, and function-like prototypes for consumers to examine or use.

Where production quantities are needed, molding is the normal way of producing parts. Production molding typically involves plastic parts made in very expensive, multiple cavity, steel molds. For example, most bottles are blow-molded and most bottle closures are injection molded. It usually takes large production quantities to justify the cost of a production mold. For market testing, on the other hand, only a few hundred parts may be needed. However, it is often necessary to mold prototype parts so that they have the same characteristics as production parts.

How to rapidly obtain molded prototype parts is therefore the challenge. Some solutions already exist for rapidly making prototype part molds from which a small quantity of parts can be cast. For example, refractory powders and a thermoplastic binder can be combined under heat in a flexible rubber pattern. This process forms a green article, which is then heated further to melt out the binder. Infiltrating the resulting porous article with a molten, low melting point metal forms a mold of high density which is free of machined surfaces. The disadvantage of this process is that the powders are sintered in order to hold the mold together after the binder is removed. Sintering causes particles to occupy less space than they would occupy unsintered. Thus, sintering shrinkage influences the accuracy of the mold and the parts made therefrom.

A sintered metal article having channels, such as for cooling fluid, may be formed by combining copper wires with sintering powders. Upon application of the sintering temperature, the wires melt and are absorbed into the pores of the sintered particles to form channels.

Another method for rapidly prototyping pans is investment casting, using patterns generated by rapid prototyping systems instead of traditional injection molded wax patterns. An example of such a pattern is a QuickCast™ pattern, which is a trademark of 3D Systems, Inc. of Valencia, Calif. A hollow plastic pattern is coated with a thin ceramic shell, usually by a dipping process. The plastic is burned out of the ceramic shell leaving minimal amounts of ash residue behind. Molten metal is then poured into the ceramic shell to cast a metal part or a metal mold for a plastic part. Because the shell has only a small hole for admitting molten metal, it is difficult to inspect the critical surfaces for ash residue. Any ash remaining on a critical surface will potentially ruin the metal casting. The molten metal cools and shrinks such that critical surfaces are not reproduced accurately. The larger the parts, the greater the inaccuracy.

Improvements to the investment casting process utilize a ceramic shell which is created around a pattern by pouring a ceramic slurry and a binder that is chemically controlled to provide for precise setting of the ceramic shell. This is an improvement to the investment casting process because shell-making is faster. However, investment casting is still limited to small size molds where molten metal shrinkage does not exaggerate inaccuracies.

What has been missing is a method for rapidly making accurate metal mold halves primarily for injection molding purposes, independent of part size, which enables a relatively large number of plastic pans to be molded therefrom.

SUMMARY OF THE INVENTION

In one aspect of the present invention a method of constructing a fully dense mold half comprises several steps. The first step involves placing a pattern in a tube. The tubular mold base has a melting temperature greater than that of an infiltration metal. It also has a first open end and a second open end. The pattern has critical pattern surfaces facing the first open end. Another step involves casting a ceramic member between the critical pattern surfaces of the pattern and the first open end of the tube to transfer critical pattern surfaces to the ceramic member. Still another step involves removing the pattern from the second open end of the tube, thereby exposing the critical ceramic surfaces of the ceramic member inside the tube. Yet another step involves covering the critical surfaces of the ceramic member with a powdered metal from the second open end of the tube. The powdered metal comprises particles having a melting temperature greater than that of an infiltration metal. There is an additional step of placing a quantity of an infiltration metal over the powdered metal, and placing the tube, having the second open end upright, in a furnace at a temperature sufficient to melt the infiltration metal without melting the powdered metal.

The quantity of the infiltration metal is sufficient to fill voids between the particles of the powdered metal when melted, thereby generating a fully dense metal mold half. The metal mold half has the critical mold surfaces transferred from the ceramic member when the infiltration metal solidifies to form critical mold surfaces. A final step involves removing the ceramic member from the first open end of the tube, thereby exposing the critical mold surfaces for molding purposes.

The step of removing the pattern may comprise burning out the pattern at a temperature below the melting temperature of the tube. The powdered metal may be selected from the group consisting of steel, stainless steel, and tungsten, and tungsten carbide may also be used. The infiltration metal may be selected from the group consisting of copper, copper alloy, and beryllium copper.

The method may further comprise a step of machining the tube so that a mating mold half may be aligned with the metal mold half in order to cast a part. Another step may include machining a sprue hole through the metal mold half in order to introduce castable material to the critical mold surfaces for casting a part.

Other process options involve placing an insulating material over the quantity of the infiltration metal when the infiltration metal is melted so that the infiltration metal solidifies first at the critical ceramic surfaces.

The method may further comprise the step of inserting a steel insert, such as coolant tubing or sleeves for ejector pins, into the powdered metal before melting the infiltration metal. The steel tubing or sleeve inserts have a melting temperature above that of the furnace temperature, so that the infiltration metal fixedly positions the coolant tubing or ejector sleeves when the infiltration metal solidifies.

In another aspect of the present invention, a method of casting a fully dense metal part involves the step of placing a metal powder into a mold having a finished surface and a means for containing the metal powder. The metal powder has a surface opposite the finished surface of the mold and a sintering temperature above the melting temperature of an infiltration metal. Another step involves melting an infiltration metal into the metal powder from the surface of the metal powder opposite the finished surface of the mold. The metal powder acts as a filter through which the molten infiltration metal flows to the finished surface of the mold, thereby filtering out of the infiltration metal any contamination and oxidized metal therein. The contaminatants, which if solidified at the finished surface of the mold, would cause a blemished surface on the cast part.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

FIG. 9 is a sectioned front elevational view thereof, similar to FIG. 4, showing the result of placing the tube in a furnace and melting the infiltration metal into the metal particles, thereby transferring the critical surfaces from the ceramic to the infiltrated metal particles;

FIG. 10 is a sectioned front elevational view thereof, similar to FIG. 4, showing removal of the ceramic material to expose the critical mold surfaces of the metal composite;

FIG. 11 is a sectioned front elevational view thereof, showing the tube rotated 90° and having both ends turned down to form a fully dense metal mold half, FIG. 12 is a sectioned front elevational view thereof, similar to FIG. 11, showing a second similarly constructed mold half about to mate with the mold half of FIG. 11 so that a pan may be molded; and FIG. 13 is a sectioned front elevation a view of a part injection molded between the mating halves of the mold of FIG. 12.

DETAILED DESCRIPTION OF THE INVENTION

Figure 1:
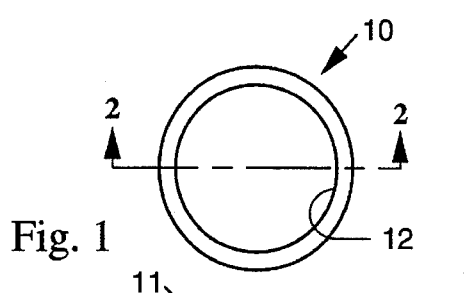
FIG. 1 is a top plan view of a tube, which is a necessary component for a the method of constructing a fully dense mold of the present invention.
Figure 2:
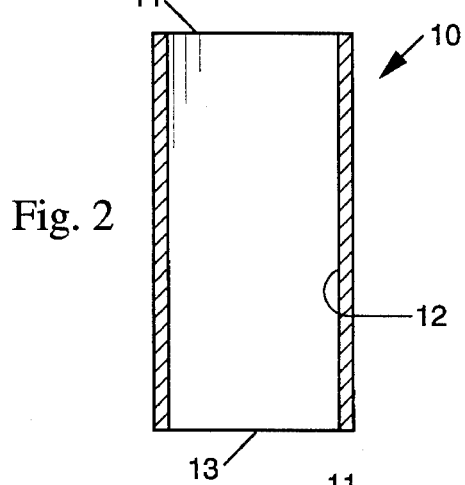
FIG. 2 is a sectioned front elevational view thereof, taken along section line 2—2 of FIG. 1, showing the inside of the tube.

Referring now to the drawings, and more particularly to FIGS. 1 and 2, there is shown a preferred tube of the present invention, which provides a method of constructing fully dense metal molds, and is generally indicated as 10. Tube 10 is tubular, with a circular internal surface 12. Tubular tube 10 is preferably made of soft steel, such as seamless tubing. The material of tube 10 should have a melting point above that of an infiltration metal described hereinafter. Tube 10 may have any number of different shaped internal surfaces 12, however, circular is preferred for ease of machining and for uniform heat transfer purposes. Internal surface 12 may be machined smooth and round such as by turning on a lathe. Tube 10 is open at both ends, having a first open end 11 and a second open end 13.

Figure 3:
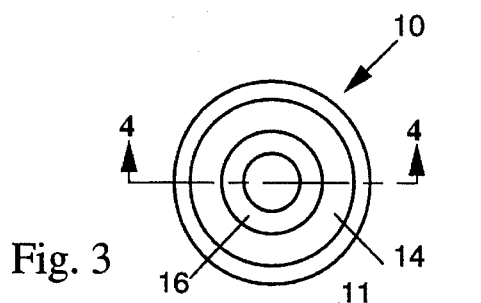
FIG. 3 is a another top plan view thereof, disclosing a pattern of a part inserted into the tube, the pattern having a skirt which enables it to fit tightly.
Figure 4:
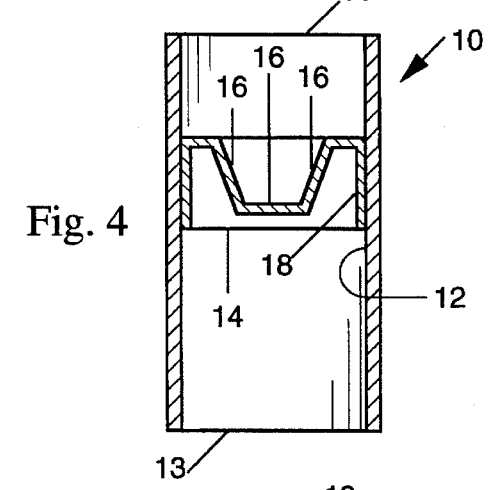
FIG. 4 is a sectioned front elevational view thereof, taken along section line 4—4 of FIG. 3, showing the pattern positioned inside the tube.

FIGS. 3 and 4 illustrate an exemplary pattern 14, which is inserted into tube 10, fitting tightly against internal surface 12 and centered therein. Pattern 14 has critical surfaces 16, which represent the exterior of a bottle closure. Pattern 14 is preferably made by a stereolithography process, well known in the prototyping art, in which an electronic file describing the pattern is rapidly convened by laser curing of a polymer to a physical pan. Even more preferably, pattern 14 is made of epoxy and is produced with a hollow honeycomb structure by a QuickCast™ process, a trademark of 3D Systems, Inc. of Valencia, Calif. Although "looks-like" pans can be made by stereolithography, such pans are rigid and brittle and do not "feel-like" molded pans.

Figure 5:
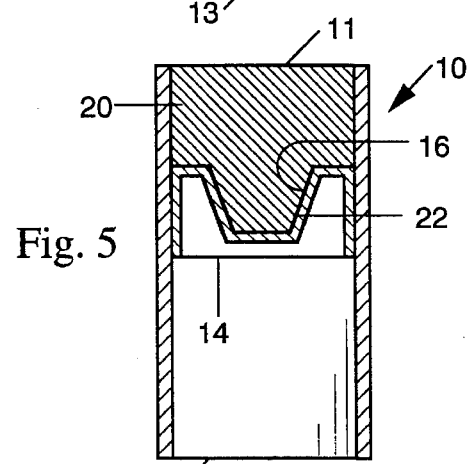
FIG. 5 is a sectioned front elevational view thereof, similar to FIG. 4, showing the addition of a ceramic material conforming to the critical pattern surfaces of the pattern.
Figure 7:
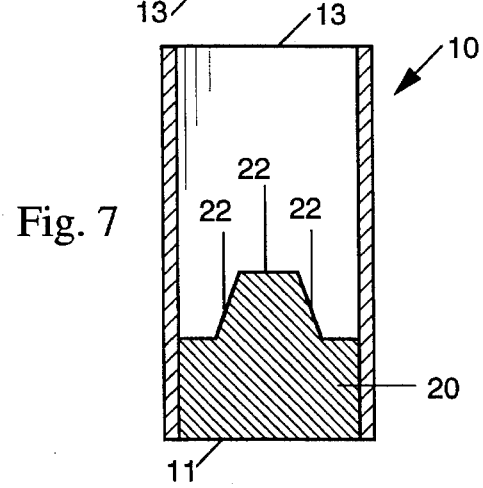
FIG. 7 is a sectioned front elevational view thereof, similar to FIG. 4, showing the pattern burned out or otherwise removed from the ceramic surface.
Figure 6:
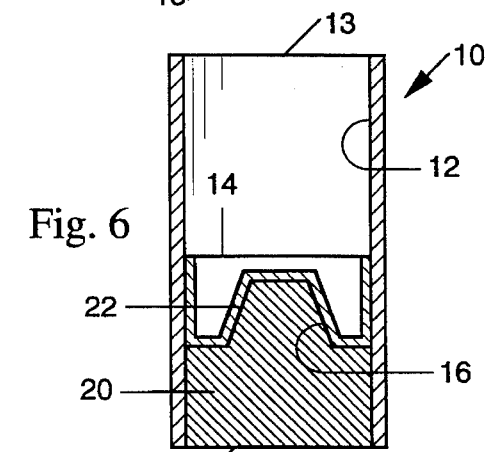
FIG. 6 is a sectioned front elevational view thereof, similar to FIG. 4, showing the tube inverted such that the pattern is atop the critical ceramic surface.

FIG. 4 shows epoxy pattern 14 pressed into tube 10 with critical pattern surfaces 16 concentric with the axis of internal wall 12 and facing upward toward first open end 11. Pattern 14 is designed with a skin 18 which isolates critical pattern surfaces 16 from the internal wall 12. FIG. 5 shows a high temperature, vacuum degassed plaster & water mixture poured into tube 10 and onto critical surfaces 16 of pattern 14. After the plaster sets up to form ceramic member 20, accurately taking the inverse shape 22 of critical pattern surfaces 16 of pattern 14, tube 10 is inverted as shown in FIG. 6, for ease of removing pattern 14. Tube 10 is then placed in a furnace, not shown, having an oxygen atmosphere to heat tube 10 to approximately 1100° F. for at least 3 hours. This temperature fully sets the plaster for further processing and burns out epoxy pattern 14, as shown in FIG. 7. Because of the hollow nature of pattern 14, it does not expand and crack ceramic member 20, but merely collapses upon itself before burning. The epoxy ash is then removed by dumping it out of the open tubing. The open end of the tubing adjacent to the epoxy pattern allows easy access to oxygen in the furnace for sufficient decarburization of the pattern during burnout. The large open end eliminates the need for complex venting as is common with investment casting pattern removal. Also, critical pattern surfaces 16, transferred to ceramic member 20 as critical ceramic surfaces 22, may be easily inspected from the open end of the tubing, to see that all ash is removed.

Figure 8:
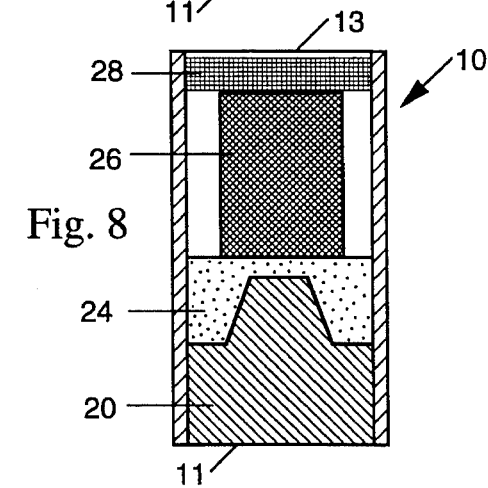
FIG. 8 is a sectioned front elevational view thereof, similar to FIG. 4, showing a layer of metal particles covering the critical ceramic surface, with a plug of infiltration metal resting atop the particles, and a layer of insulation above the plug.
Figure 14:
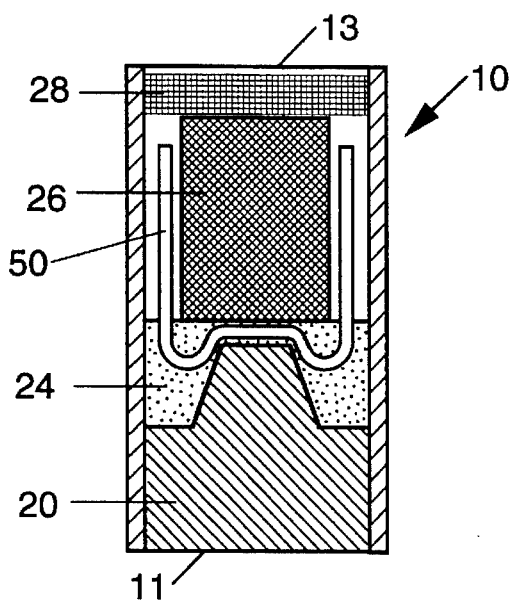
FIG. 14 is a sectional front elevational view similar to FIG. 8, showing a cooling tube inserted into the layer of particles.
Figure 15:
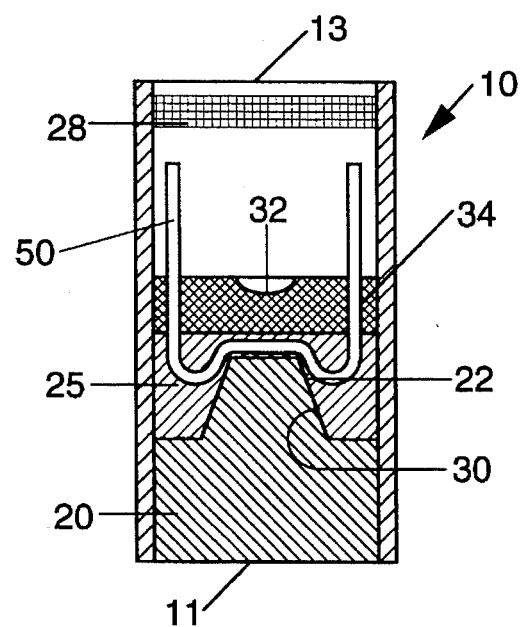
FIG. 15 is a sectional front elevational view similar to FIG. 9, showing the cooling tube insert surrounded by infiltration metal and particles.

FIG. 8 shows the addition of a fine powder 24, such as tungsten, tungsten carbide, or steel alloy, onto critical ceramic surfaces 22 of ceramic member 20. After the metal powder is poured into the tube, the tubing is tapped several times to settle the powder. Preferably tungsten carbide is used because of its high melting point of about 5050° F. The depth of powder is sufficient to cover all critical ceramic surfaces 22. Powder 24 is preferably screened to a minus 100 mesh/plus 230 mesh, having particle sizes ranging from 63 microns to 153 microns.

On top of powder 24 is placed particles, chips, or a slug of infiltration metal 26 of sufficient quantity to more than fill the voids between the powder particles. Infiltration metal 26 may be copper or its alloys but is preferably beryllium copper because of its hardness and thermal conductivity. Tube 10 is then placed in a hydrogen furnace, not shown. A layer of insulation 28 is placed above beryllium copper slug 26. The furnace is ramped up to about 2100° F. and held there for at least one hour. In the reducing atmosphere of the furnace, this temperature causes beryllium copper slug 26 to melt and flow into unmelted powder 24 to form metal composite 25, as shown in FIG. 9. The metal powder acts as a filter and prevents impurities from the molten infiltration metal reaching the critical ceramic surfaces. This eliminates the need for a porous ceramic filter, such as those used for investment castings.

As the beryllium copper cools, it shrinks. However, unmelted metal particles 24, which have been packed together, provide a high percentage of the volume of material adjacent critical ceramic surfaces 22. Because particles 24 do not melt or sinter at the melting temperature of infiltration metal 26, they do not shrink. The beryllium copper fills between the particles and fuses to the inner surface 12 of tube 10, making the tube a permanent part of the mold. Insulation 28 causes the beryllium copper near critical ceramic surfaces 22 to solidify first, and therefore to minimize distortion and shrinkage stresses at surfaces 22 where the metal composite accurately assumes critical mold surfaces 30, the inverse of critical ceramic surfaces 22, and therefore the replicate of critical pattern surfaces 16 of pattern 14. Molten infiltration metal 26 is drawn down from its upper surface, maintained molten by insulation 28 as it solidifies, causing a shrinkage dimple 32 to form atop the excess solidified infiltration metal 34.

Particle size, particle size distribution, and particle shape of the metal powder can affect the process in several ways. Finer particles usually result in a smoother surface finish, but also require longer infiltration times. Particle size distribution affects the tap density of the metal powder, which in turn affects the metal-powder-to- infiltration-metal ratio in the final mold. The tap density of minus 100/plus 230 mesh metal powders typically average between 40% and 55%. By tailoring the particle size distribution, the tap densities can be significantly increased. Tungsten carbide powders tend to be irregularly shaped instead of spherically shaped. This can affect the flow within finer particle size distributions, such as minus 325 mesh powder, and cause agglomeration when powder is poured onto the critical surfaces of the ceramic member. Such agglomeration adversely affects the surface finish of composite 25. Minus 100/plus 230 mesh tungsten carbide powder is used preferably because it is readily available commercially and it provides a good surface finish.

Finer powders not only do not flow well, but also they require more care because they can be a potential inhalation hazard and explosion hazard.

During the infiltration process in the hydrogen furnace, steel tube 10 thermally expands at a greater rate than ceramic member 20. This causes a small gap between inner surface 12 and ceramic member 20. Infiltration metal may leak through this gap. However, leakage is typically minimal and does not cause problems with the process. The leakage could be prevented by tailoring the particle size distribution near the gap such that capillary forces in the powder counteract the gravity forces acting on the molten infiltrating metal.

FIG. 10 shows the removal of ceramic member 20 to expose critical surfaces 30. Insulation 28 is also removed from tube 10. Finally, the ends of tube 10 are turned down to the level of the outermost of critical mold surfaces 30, as shown in FIG. 11, and excess infiltration metal 34 is faced off square with internal surface 12, thereby forming a mold half 36. Mold half 36 also has sprue hole 38 machined into it, as shown in FIG. 12.

FIG. 12 also shows a mold half 40 being mated with mold half 36 to form a mold cavity between them. Mold half 40 is preferably made by the same rapid prototyping method as mold half 36. Mold halves 36 and 40 preferably are combined to be an injection mold. When molten plastic resin is injected through sprue hole 38 into the cavity, plastic closure 42 is molded. Plastic bottle closure 42 is shown in FIG. 13, removed from the mold.

The important features of this process are its use of simple, rapid turn-around steps, and its accurate transfer of critical ceramic surfaces from pattern to molded part. Also, this mold-making process is not limited to small parts, as is investment casting, where inaccuracy due to shrinkage increases with part size. The fully dense metal mold structure of the present invention is both highly heat conductive and very wear resistant because of the materials chosen.

Steel cooling water tubes 50 and/or ejector sleeves may be added into the powder before the infiltration metal is melted. The molten beryllium copper then solidifies around the unmelted steel water tubes to fix them in place.

In a particularly preferred embodiment of the present invention, tube 10 is made of low carbon steel seamless tubing, with an outside diameter of 101.6 mm, an inside diameter turned to 88.9 mm, and a length of 254 mm. Pattern 14 is made of epoxy resin #SL5170, from 3D Systems, Inc., and is generated from an electronic file by a stereolithography process, using a model SLA-250 machine, made by 3D Systems, Inc. of Valencia, Calif.

Pattern 14 may be burned out of tube 10 at a temperature of 1100° F. Ceramic member 20 is formed by pouring a mixture of water and plaster onto the critical pattern surfaces 16 of pattern 14. The plaster is Core C 1 plaster made by Ransom & Randolf of Maumee, Ohio. It withstands molten metal temperatures of 2500° F. without degrading. However, plaster member 20 may be easily removed from the tube by physically cracking it and removing pieces without contacting the particle and infiltration metal surface. Alternatively, glass bead blasting may be used to remove the plaster without disturbing the surface of the fully dense metal mold surfaces.

Insulation 28 is preferably Fiberfrax, made by Carborundum Corp. of Niagara Falls, N.Y. An insulation layer at least as thick as the thickness of ceramic member 20 is preferred.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention. For example, the description of the present invention has been directed primarily toward the fabrication of metal molds. Other potential applications envisioned include the fabrication of electrodes for electric discharge machining (EDM). A copper alloy/tungsten alloy composite metal electrode would provide excellent electrical conductivity and wear resistance properties essential for EDM processes.

What is claimed is:

1. A method of constructing a fully dense mold half comprising the steps of:
   a) placing a pattern in a tube, said tube having a melting temperature greater than that of an infiltration metal, a first open end, and a second open end, said pattern having critical pattern surfaces facing said first open end;
   b) casting a ceramic member between said critical pattern surfaces and said first open end of said tube to transfer critical pattern surfaces to said ceramic member, creating critical ceramic surfaces having a shape inverse to said critical pattern surfaces;
   c) removing said pattern from said second open end of said tube, to expose said critical ceramic surfaces inside said tube;
   d) covering said critical ceramic surfaces with a powder, said powder comprising particles having a melting temperature greater than that of an infiltration metal;
   e) placing a quantity of an infiltration metal over said powder, and placing said tube, having said second open end upright, in a furnace at a temperature sufficient to melt said infiltration metal without melting said powder and said tube, said quantity of said infiltration metal being sufficient to fill voids between said particles, thereby generating a fully dense metal mold half, said metal mold half having critical mold surfaces transferred from said ceramic member when said infiltration metal solidifies, said critical mold surfaces having a shape inverse to said critical ceramic surfaces; and
   f) removing said ceramic member from said first end of said tube, to expose said critical mold surfaces for molding purposes.

2. The method of claim 1 wherein said step of removing said pattern comprises burning out said pattern at a temperature below said melting temperature of said tube.

3. The method of claim 1 further comprising the steps of:
   g) machining said tube so that a mating mold half may be aligned with said metal mold half in order to cast a part; and
   h) machining a sprue hole through said metal mold half in order to introduce castable material to said critical mold surfaces for casting said part.

4. The method of claim 1 wherein said powder is selected from the group consisting of steel, stainless steel, tungsten, and tungsten carbide.

5. The method of claim 1 wherein said infiltration metal is selected from the group consisting of copper, copper alloy, and beryllium copper.

6. The method of claim 1 wherein an insulating material is placed over said quantity of said infiltration metal when said infiltration metal is melted so that said infiltration metal solidifies first at said critical ceramic surfaces.

7. The method of claim 1 further comprising the step of inserting steel inserts into said powder before melting said quantity of an infiltration metal, said inserts having a melting temperature above that of said furnace temperature, said quantity of an infiltration metal fixedly positioning said inserts when said infiltration metal solidifies in said voids between said particles and around said inserts.

8. A method of constructing a fully dense mold half comprising the steps of:
   a) placing an epoxy pattern in a tube, said tube having a melting temperature greater than that of an infiltration metal, a first open end, and a second open end, said pattern having critical pattern surfaces facing said first open end;
   b) casting a ceramic member between said critical pattern surfaces of said pattern and said first open end of said tube to transfer critical pattern surfaces to said ceramic member, creating critical ceramic surfaces having a shape inverse to said critical pattern surfaces;
   c) burning out said epoxy pattern from said second open end of said tube, thereby exposing said critical ceramic surfaces inside said tube;
   d) covering said critical ceramic surfaces with a powder, said powder comprising particles having a melting temperature greater than that of an infiltration metal;
   e) placing a quantity of an infiltration metal over said powder, and placing an insulating material over said quantity of an infiltration metal;
   f) placing said tube, having said second open end upright, in a hydrogen furnace at about 2100° F., said quantity of an infiltration metal being sufficient to fill voids between said particles of said powder when melted, thereby generating a fully dense metal mold half, said metal mold half having critical mold surfaces transferred from said ceramic member when said quantity of an infiltration metal solidifies, said critical mold surfaces having a shape inverse to said critical ceramic surfaces;
   g) removing said ceramic member from said first end of said tube, to expose said critical mold surfaces for molding purposes;
   h) machining said tube so that a mating mold half may be aligned with said metal mold half in order to cast a part; and
   i) machining a sprue hole through said metal mold half in order to introduce castable material to said critical mold surfaces for casting said part.

9. The method of claim 8 wherein said powder is selected from the group consisting of steel, stainless steel, tungsten, and tungsten carbide.

10. The method of claim 8 wherein said infiltration metal is selected from the group consisting of copper, copper alloy, and beryllium copper.

11. The method of claim 8 further comprising the step of inserting steel inserts into said powder before melting said quantity of an infiltration metal, said inserts having a melting temperature above that of said furnace temperature, said quantity of an infiltration metal fixedly positioning said inserts when said infiltration metal solidifies in said voids between said particles and around said inserts.

* * * * *

UNITED STATES PATENT AND TRADEMARK OFFICE
CERTIFICATE OF CORRECTION

PATENT NO. : 5,507,336
DATED : April 16, 1996
INVENTOR(S) : James R. Tobin

It is certified that error appears in the above-indentified patent and that said Letters Patent is hereby corrected as shown below:

*Column 7, Claim 3g), after "to" delete -- east -- and insert therefor -- cast --.*

Signed and Sealed this

Tenth Day of April, 2001

Attest:

NICHOLAS P. GODICI

*Attesting Officer*    *Acting Director of the United States Patent and Trademark Office*